US009386845B2

(12) United States Patent
Wu et al.

(10) Patent No.: US 9,386,845 B2
(45) Date of Patent: Jul. 12, 2016

(54) DUAL-FUNCTION FOOD TRAY SUPPORT TUBES FOR A GALLEY CART

(71) Applicant: The Boeing Company, Chicago, IL (US)

(72) Inventors: Tateh Wu, Bellevue, WA (US); Marcus K. Richardson, Bothell, WA (US); Kyongsoo Chae, Chicago, IL (US); Raymond H. Horstman, Chicago, IL (US); James P. Schalla, Edmonds, WA (US)

(73) Assignee: The Boeing Company, Chicago, IL (US)

(*) Notice: Subject to any disclaimer, the term of this patent is extended or adjusted under 35 U.S.C. 154(b) by 257 days.

(21) Appl. No.: 13/907,475

(22) Filed: May 31, 2013

(65) Prior Publication Data
US 2014/0352929 A1   Dec. 4, 2014

(51) Int. Cl.
| | |
|---|---|
| *B41J 29/377* | (2006.01) |
| *A47B 77/08* | (2006.01) |
| *A47B 31/02* | (2006.01) |
| *B62B 3/00* | (2006.01) |
| *B64D 11/00* | (2006.01) |
| *A47B 31/06* | (2006.01) |
| *F25D 3/12* | (2006.01) |
| *F25D 23/06* | (2006.01) |
| *A47B 31/00* | (2006.01) |

(52) U.S. Cl.
CPC .................. *A47B 31/02* (2013.01); *A47B 31/06* (2013.01); *B62B 3/00* (2013.01); *B64D 11/0007* (2013.01); *F25D 3/125* (2013.01); *F25D 23/067* (2013.01); *A47B 2031/002* (2013.01); *A47B 2031/003* (2013.01); *B62B 2202/00* (2013.01)

(58) Field of Classification Search
CPC .. A47B 31/02; A47B 31/06; A47B 2031/002; A47B 2031/026; A47B 77/08; A47B 2031/003; B62B 3/00; F25D 3/125; F25D 23/067; F25D 23/062; B64D 11/0007; B64D 2013/0629; B41J 29/377; A47J 39/006
See application file for complete search history.

(56) References Cited

U.S. PATENT DOCUMENTS

| | | | | |
|---|---|---|---|---|
| 3,982,584 | A * | 9/1976 | Spanoudis | ............ A47J 39/006 165/42 |
| 4,397,159 | A | 8/1983 | Dodd et al. | |
| 4,399,667 | A | 8/1983 | Lamb | |
| 4,898,294 | A * | 2/1990 | Jennings | ................. F25D 3/125 220/592.09 |

(Continued)

FOREIGN PATENT DOCUMENTS

| | | |
|---|---|---|
| DE | 8627604 U1 | 2/1988 |
| EP | 0080313 B1 | 2/1986 |

*Primary Examiner* — Frantz Jules
*Assistant Examiner* — Martha Tadesse
(74) *Attorney, Agent, or Firm* — Felix L. Fischer

(57) ABSTRACT

A galley cart incorporates a housing defining a cavity and having an opening. A door is hingedly attached to the housing to seal the opening and allow access to the cavity through the opening. A compartment is provided in the cart configured to contain cooling media. An integrated support rail is coupled to the housing within the cavity and configured to at least partially support a tray within the cavity. The support rail has multiple orifices therethrough and the support rail is in flow communication with the compartment.

17 Claims, 10 Drawing Sheets

(56) References Cited

U.S. PATENT DOCUMENTS

| | | | |
|---|---|---|---|
| 5,975,202 A * | 11/1999 | Grandi | A47J 39/006 165/48.1 |
| 6,351,381 B1 * | 2/2002 | Bilski | F28D 15/0266 165/104.33 |
| 6,626,508 B1 | 9/2003 | Hase et al. | |
| 6,684,657 B1 * | 2/2004 | Dougherty | A47J 39/003 165/918 |
| 6,941,764 B2 | 9/2005 | Leroy et al. | |
| 7,226,353 B2 * | 6/2007 | Bettridge | H05K 7/20736 361/695 |
| 8,730,671 B2 * | 5/2014 | VanDerVeen | H05K 7/20736 165/104.33 |
| 9,200,831 B2 * | 12/2015 | Lauchnor | F25D 31/007 |
| 2005/0028543 A1 * | 2/2005 | Whitehead | A47J 39/003 62/237 |
| 2006/0070814 A1 | 4/2006 | Hu | |
| 2008/0220139 A1 * | 9/2008 | Palmer | A23B 4/06 426/524 |
| 2009/0025416 A1 * | 1/2009 | Murakami | F25B 41/04 62/324.6 |
| 2011/0277489 A1 * | 11/2011 | Schalla | A47B 31/02 62/89 |

\* cited by examiner

DUAL-FUNCTION FOOD TRAY SUPPORT TUBES FOR A GALLEY CART

BACKGROUND INFORMATION

1. Field

Embodiments of the disclosure relate generally to the field of food service carts for airline in-flight food service and more particularly to dual function tray supports including channeling attached to a cooling compartment for cooling gas flow for distributed cooling.

2. Background

Galley carts are used on an aircraft to store food and beverages that need to be refrigerated and/or frozen during the duration of a flight. Conventional galley carts include a powered heat exchanger known as a chiller to cool a housing cavity of the cart where the food products are stored. However, the heat exchanger discharges heated air to the environment surrounding the cart and consumes power that can be otherwise be used by the aircraft. Further, additional cabin cooling is needed to counteract the heated air discharged from the heat exchanger. As such, at least some known galley carts use dry ice to cool the housing cavity. However, when the dry ice is placed within the cart, it cools locally and the cooling stratifies along the height of the cart. The dry ice placed within the cart cools locally and then the cooler air settles to the bottom trays. When the cooler air settles, the upper trays can be too warm (i.e. above 40° F.) and the lower trays are freezing (i.e. below 32° F.). To alleviate this problem, fans may be added to the carts to circulate the cool air within the body cavity. However, the fan requires a power source. Alternatively, the dry ice can be placed in the top portion of the cart such that the upper trays are cooled locally by the dry ice and the upper and middle trays are cooled by the cool air flowing past as it settles to the bottom trays. However, over time, the cooling further stratifies such that middle trays are warmer than upper trays and lower trays and/or the upper and middle trays are warmer than bottom trays. This problem can be addressed by fine tuning the amount of dry ice, but the amount can be difficult to determine because of the many factors impacting cooling during a flight and on the ground.

It is therefore desirable to provide a galley cart with distributed cooling which overcomes the limitations of current galley carts.

SUMMARY

Embodiments disclosed herein provide a container which incorporates a housing defining a cavity and having an opening. A door is hingedly attached to the housing to seal the opening and allow access to the cavity through the opening. A compartment is provided in the container configured to contain cooling media. An integrated support rail is coupled to the housing within the cavity and configured to at least partially support a tray within the cavity. The support rail has multiple orifices therethrough and the support rail is in flow communication with the compartment.

The embodiments provide a method for cooling a galley cart by providing a cooling compartment in a cart with cooling media. Integrated support rails with piccolo tubes are interconnected with the cooling compartment to distribute cooling gas. Dividers resting on the integrated support rails are engaged with insulating sealing members on a door and an opposite end of the cart to create cooling chambers within the cavity of the cart. Cooling gas flows from the cooling compartment through the piccolo tubes through multiple orifices along the length of the piccolo tubes and into the cooling chambers to cool the chambers.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a storage container for food and beverages for use, in example embodiments, as a galley cart for airline in-flight service. The cart includes tray supports formed from tubes having holes defined through the tubes, called "piccolo tubes" herein. The tubes are in flow communication with a compartment containing dry ice. As the dry ice sublimates, the cold gas is forced from the compartment into the tubes as the pressure within the compartment increases. The size and/or number of holes in each support tube determines how much cold air is ejected into a volume below each support tube. The volumes are defined between adjacent trays within the cart. Different hole configurations (or closing at least some holes) at each selected tray support level can facilitate providing uniform cooling throughout the height of the cart. In one embodiment, the compartment is positioned at the top of the housing. A vertical manifold extends downwardly from the compartment, and the support tubes extend from the vertical manifold. Alternatively, the compartment can be defined within the door of the cart. In such an embodiment, the support tubes are in flow communication with the compartment through an inner surface of the door. The inner surface can include a compressible material that forms a seal against end edges of the trays within the cart when the door is closed.

Figure 1A:
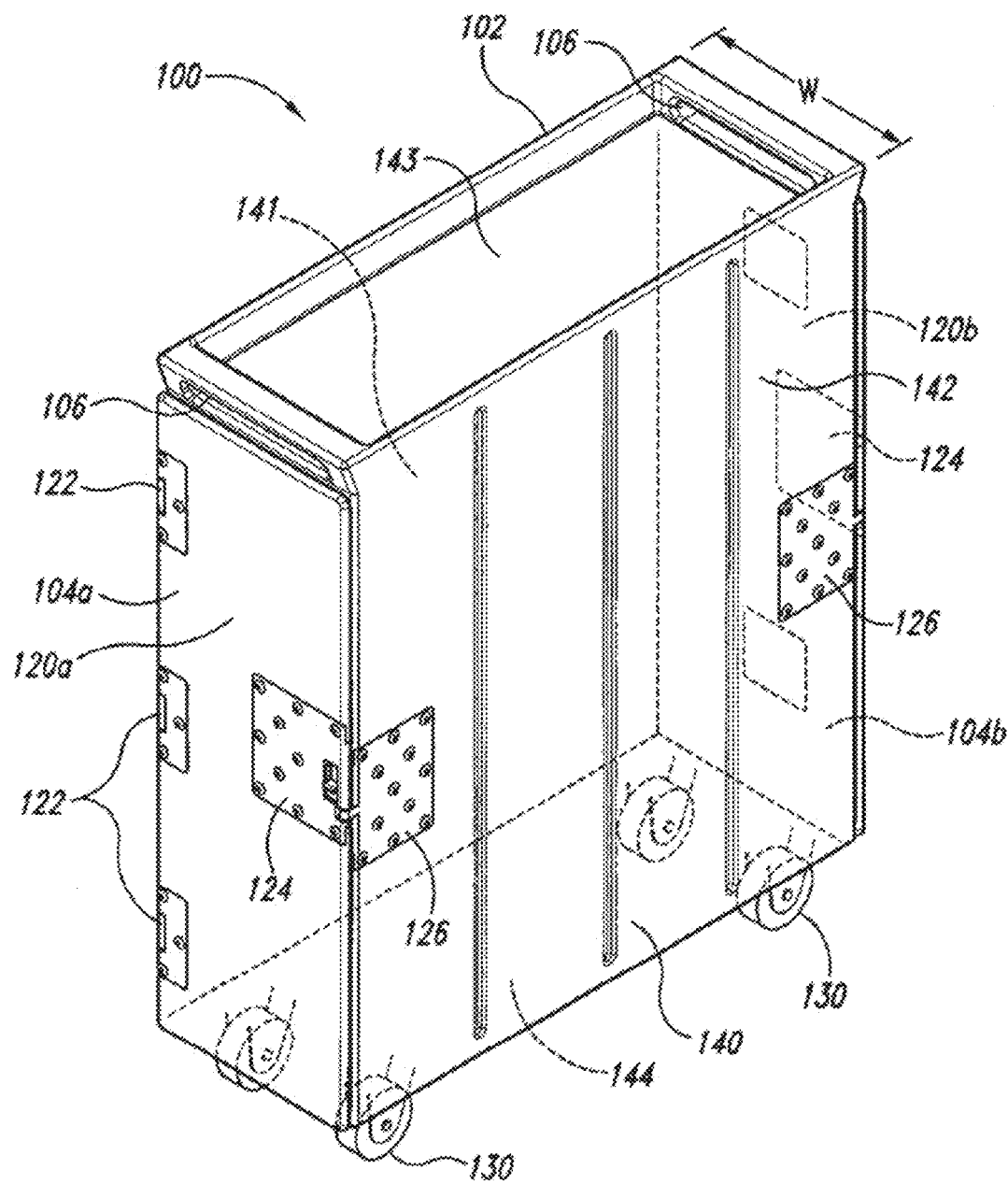
FIG. 1A is an external isometric view of a galley cart with which the present embodiments may be employed.
Figure 1B:
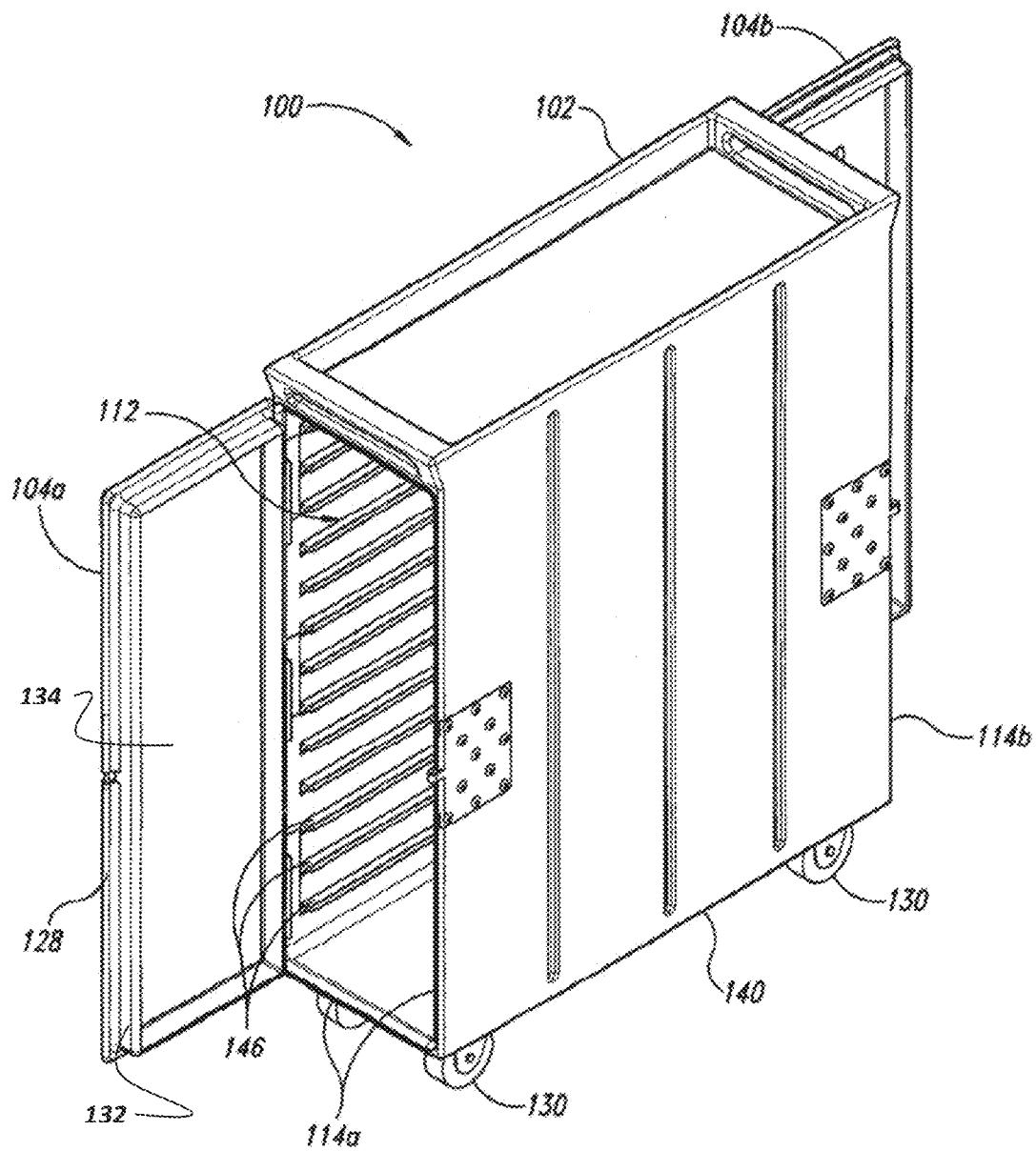
FIG. 1B is an isometric view of the galley cart of FIG. 1A with the doors open exposing the interior cavity of the housing of the cart.

Referring to the drawings, FIGS. 1A and 1B are isometric views of a galley cart 100 which may be employed in the embodiments disclosed herein. Referring to FIGS. 1A and 1B together, in one aspect of this embodiment, the galley cart 100 includes a housing 102 having a shell 140. In the illustrated embodiment, the shell 140 forms a first side portion 141, a second side portion 142, a top portion 143, and a bottom portion 144 of the case 102. The galley cart 100 further includes a first door 104a positioned toward one end of the housing 102, and, for certain embodiments, a second door 104b positioned toward an opposite end of the case 102. Each of the doors 104 can further include a plurality of hinges 122 and a latch 124. The hinges 122 pivotally attach the door shells 120 to the shell 140. The latch 124 can be configured to releasably engage corresponding receivers 126 attached to the shell 140 when the doors 104 are in closed positions as illustrated in FIG. 1A.

By disengaging the latch 124 from the corresponding receiver 126, the doors 104 can be opened outwardly providing access to an interior cavity 112 of the housing 102 as illustrated in FIG. 1B. In a further aspect of this embodiment, the interior cavity 112 of the housing 102 includes a plurality of integrated support rails 146 configured to support a plurality of food trays as will be described in greater detail subsequently. Positioning the doors 104 at respective ends of the housing 102 allows flight attendants to conveniently access food stored within the housing 102 from either end of the galley cart 100. In other embodiments, the second door 104b can be omitted if desired. As further illustrated in FIG. 1B, each of the doors 104 can additionally include a compressible seal 128 configured to seal any gaps that may exist between the doors 104 and corresponding housing apertures 114a-b when the doors 104 are closed. Additionally, the doors 104 include a rim 132 which forms a housing 134 (seen in FIG. 1B) to be described in greater detail subsequently. Wheels or casters 130 allow the galley cart to be easily maneuvered within the service areas and aisles of the aircraft. Handles 106, integral with the top portion 143 for the embodiment shown, are provided to be grasped by the flight attendants when maneuvering the galley cart.

Figure 2:
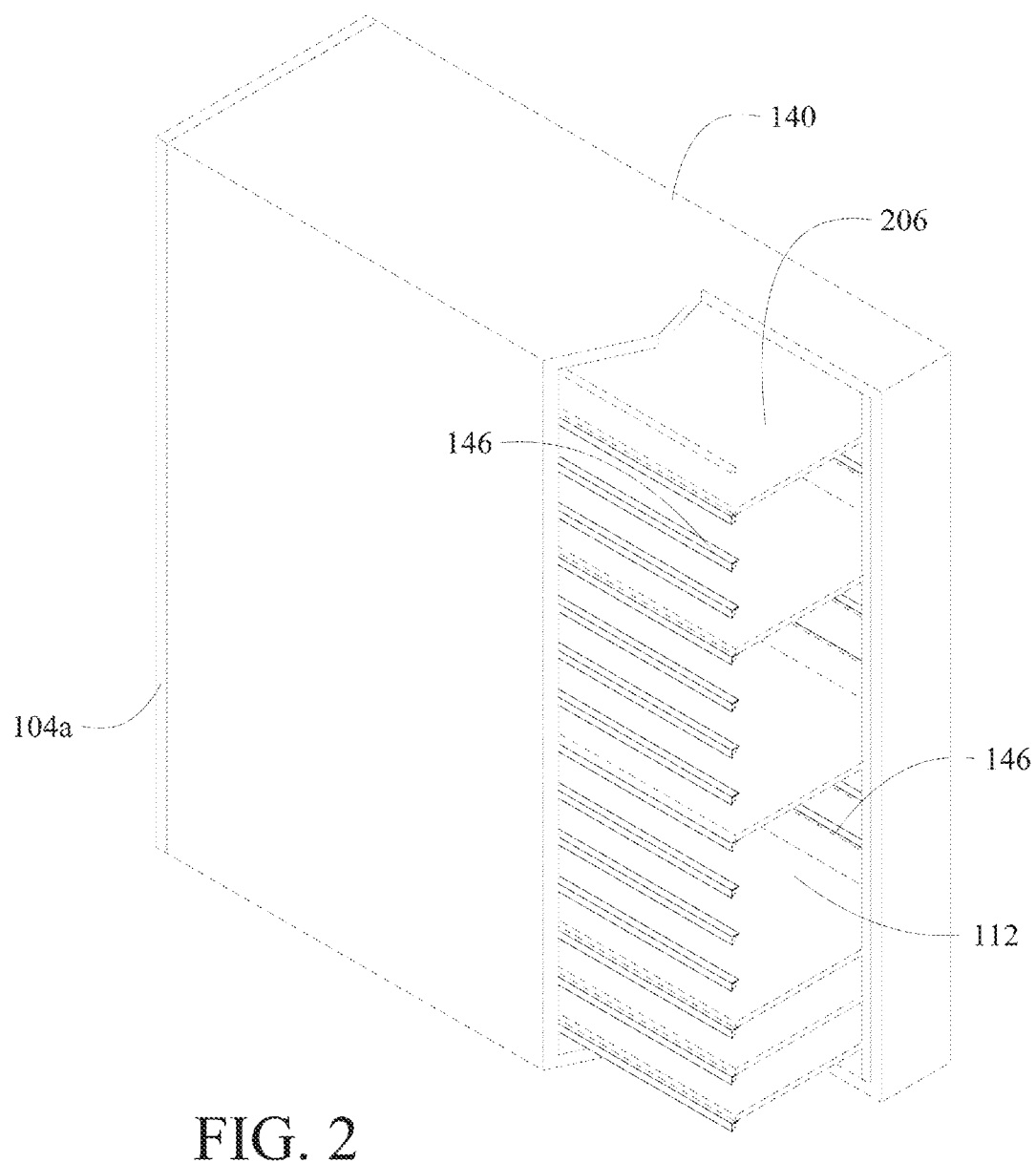
FIG. 2 is an isometric view of the case of the cart with the integrated supports shown in cutaway to view the interior with selected serving trays removed for clarity.
Figure 3:
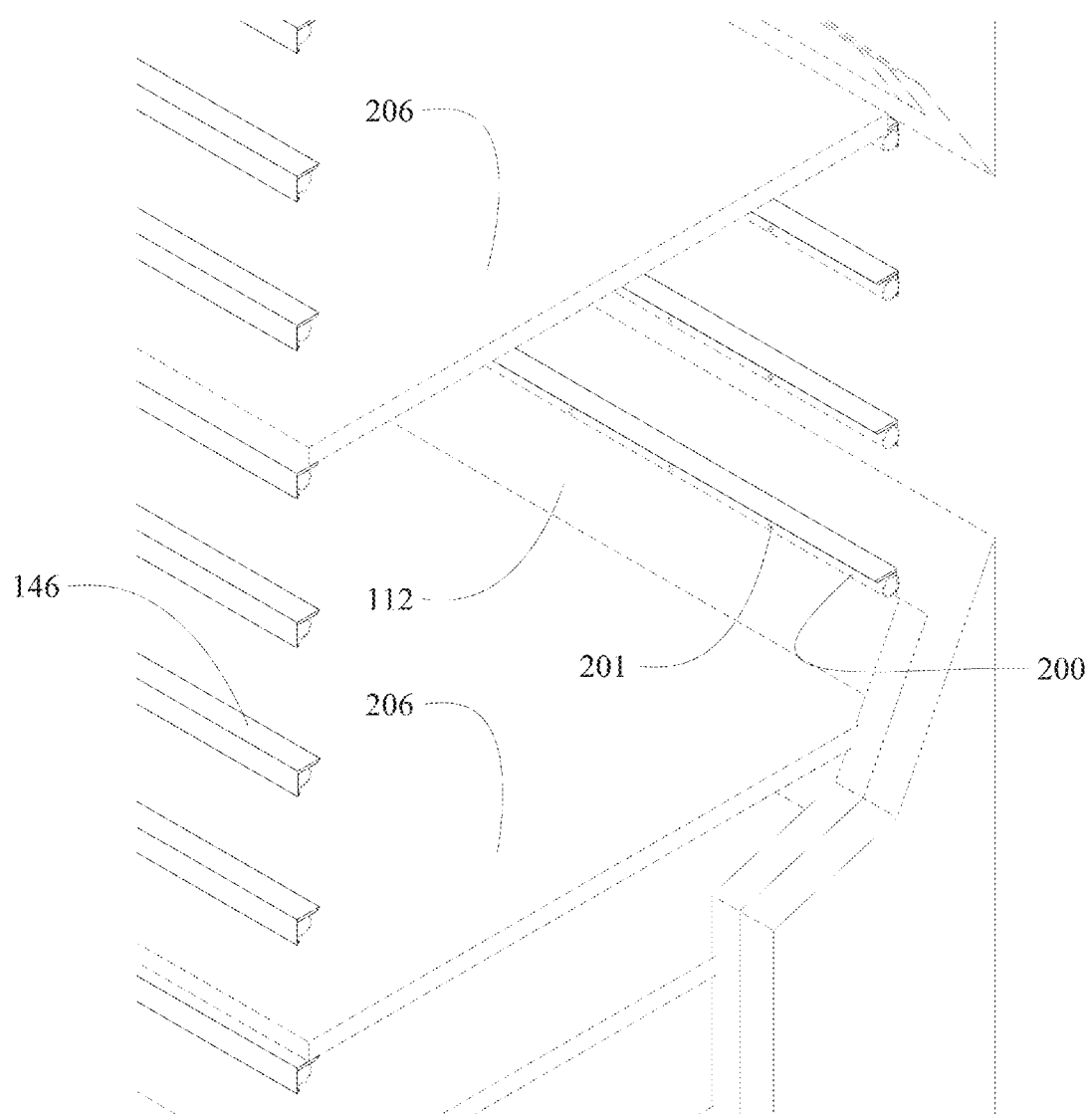
FIG. 3 is a detailed isometric view of the integrated supports with cooling piccolo tubes.
Figure 4:
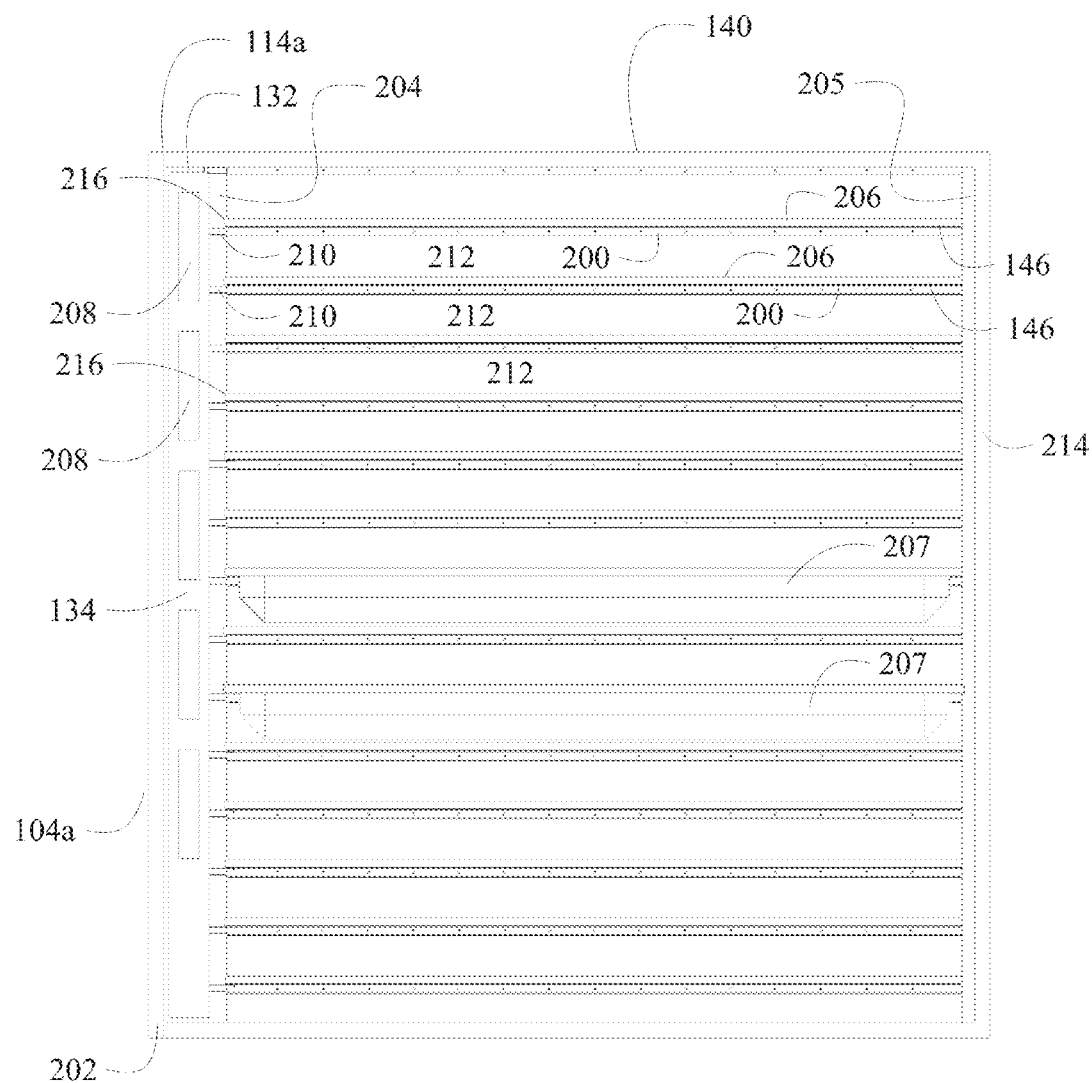
FIG. 4 is a side section view of the case.

A first embodiment shown in FIG. 2 demonstrates the shell 140 creating the cavity 112 with the shell top 143 and side 142 shown in cutaway to expose the interior. Integrated support rails 146 are spaced along the walls 141 and 142 of the shell. The integrated support rails 146 include piccolo tubes 200 which provide for integrated cooling gas flow as will be described in greater detail subsequently. As shown in detail in FIG. 3, each piccolo tube incorporates multiple orifices 201 spaced on the length of the tube. The orifice diameter is about 0.005 inch to 0.03 inch. Depending on orifice size and number used per piccolo tube, the orifice spacing is about 2 inches to 12 inches. Serving trays 206 (shown in FIG. 3) are supported by the integrated support rails 146 spaced within the cavity 112. The piccolo tubes 200 are represented for the embodiments shown as cylindrical (circular cross section). However in alternative embodiments the piccolo tubes may be rectangular or any suitable shape in cross section. Placement of the orifices around the circumference (or in the side or bottom of rectangular cross sections) of the piccolo tubes may also be determined based on desired flow patterns as will be described in greater detail subsequently. As shown in FIG. 4, the first door 104a is shown with the rim 132 received within the cavity 112 through the aperture 114a in the end of the shell 140. The door 104a, seen in side section in FIG. 4, incorporates an outer plate 202 from which the rim 132 extends. The rim is inset from a periphery of the plate 202 to be closely received into the aperture 114a. An insulated sealing member 204 is secured against the rim 132 or in the periphery of the rim 132 supported by a relief. The insulating sealing member 204 may be a pliable foam such as Styrofoam or urethane which is resiliently compressible to at least a limited degree.

The housing 134 in the door 104a contains cooling media such as multiple cooling pucks 208 which are supported between the outer plate 202 and insulating sealing member 204, as will be described in greater detail subsequently, to create a source of chilled gas in the housing 134. The cooling pucks 208 may be standard dry ice pucks of 5 inch diameter by 1 inch thickness or any suitable dimension. The insulating sealing member 204 incorporates multiple orifices 210 which allow convective flow of chilled gas from the door housing 134 into the piccolo tubes 200 of the integrated support rails 146. Sizing of the orifices 210 in combination with the piccolo tube diameter and diameter of the orifices 201 may be predetermined to provide a specific convective cooling capacity based on flight duration, puck material and number/configuration of pucks loaded in the door housing 134. The piccolo tubes 200 have a diameter of about 0.1 inch to 0.4 inch to flow chilled gas from the housing 134 to the orifices 201.

Figure 5:
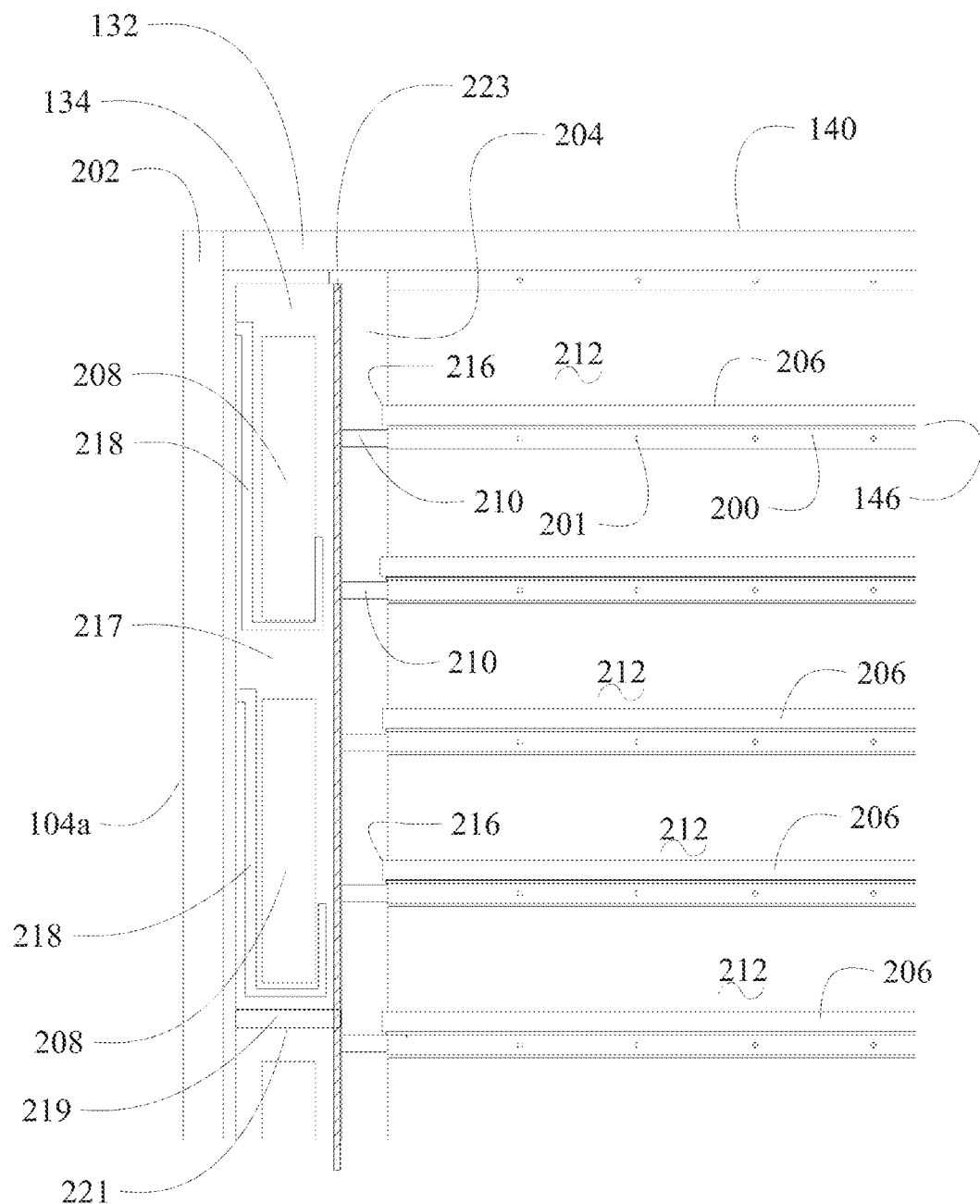
FIG. 5 is a side partial section detailed view of the first embodiment with dry ice support compartments.

As seen in FIG. 4, the serving trays 206 are sized to be closely received at a first end against the insulating sealing member 204 and closely received at an opposite end against a second insulating sealing member 205, slightly compressing the insulating sealing members to act as dividers creating multiple sealed chambers 212 within the cavity 112. The availability of multiple chambers allows selection of the number and placement of cooling pucks in the door housing 134. All chambers may be cooled or only selected chambers. For the embodiment show in FIG. 4, the second insulating sealing member is supported against an end wall 214. However, a second door 104b, as shown in FIG. 1B, configured in the same manner as door 104a described above may be employed closing the second aperture 114b. The insulating sealing members may include grooves or slots 216, as seen in FIGS. 4 and 5, aligned with the support rails 146 to more closely engage the serving trays 206 or other dividers such as food containers 207. The engagement of serving trays 206 on each set of integrated support rails 146 by the insulating sealing members 204 and 205 allows as many cooling chambers to be created as there are trays supported by integrated support rails in the cart.

As seen in detail in FIG. 5, the door 104a provides the housing 134 to receive the cooling pucks 208 in the first embodiment described with respect to FIG. 4. For the embodiment shown, baskets 218 support the cooling pucks in the housing 134. The baskets for the embodiment shown are a mesh or perforated thermally non-conductive material such as nylon or similar material. A simple L shape allows securing the baskets 218 to the inside surface of the door outer plate 202. In certain embodiments closing baskets may be employed to securely retain the pucks. For an example embodiment, the insulating sealing member 204 is attached to the door rim 132 using a hinge 223 allowing the insulating sealing member to pivot out of the cavity with the door 104a in the open condition to allow insertion of the pucks 208 into the baskets 218. Additionally, the housing may be segregated by partitions 219 into cooling compartments 217 to limit internal convection within the door housing thereby limiting stratification within the housing itself. For the embodiment shown, the partitions 219 are placed in alignment with selected divider serving trays 206 so the cooling compartments 217 in the door correspond to a select number of cooling chambers 212 in the cavity 112 of the cart. The dividing walls 219 may be fixed or may be removably positioned in slots 221 in the rim 132 and door outer plate 202. The slots may be aligned to correspond with selected support rails 146. Orifices 210 align with the entrance to the piccolo tubes 200 for gas flow through the piccolo tubes through orifices 201 into the cooling chambers 212.

Figure 6:
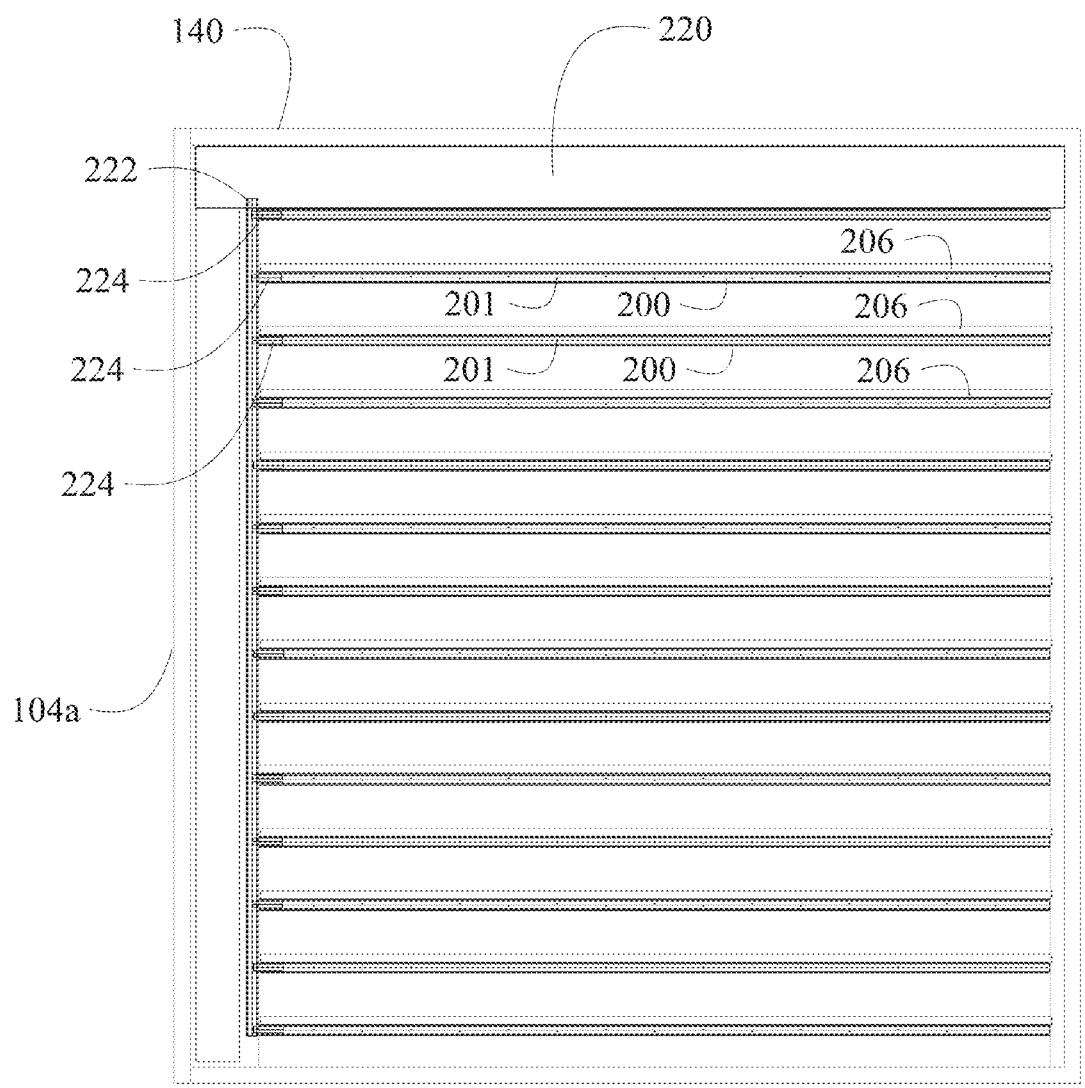
FIG. 6 is a side section view of a second embodiment.
Figure 7:
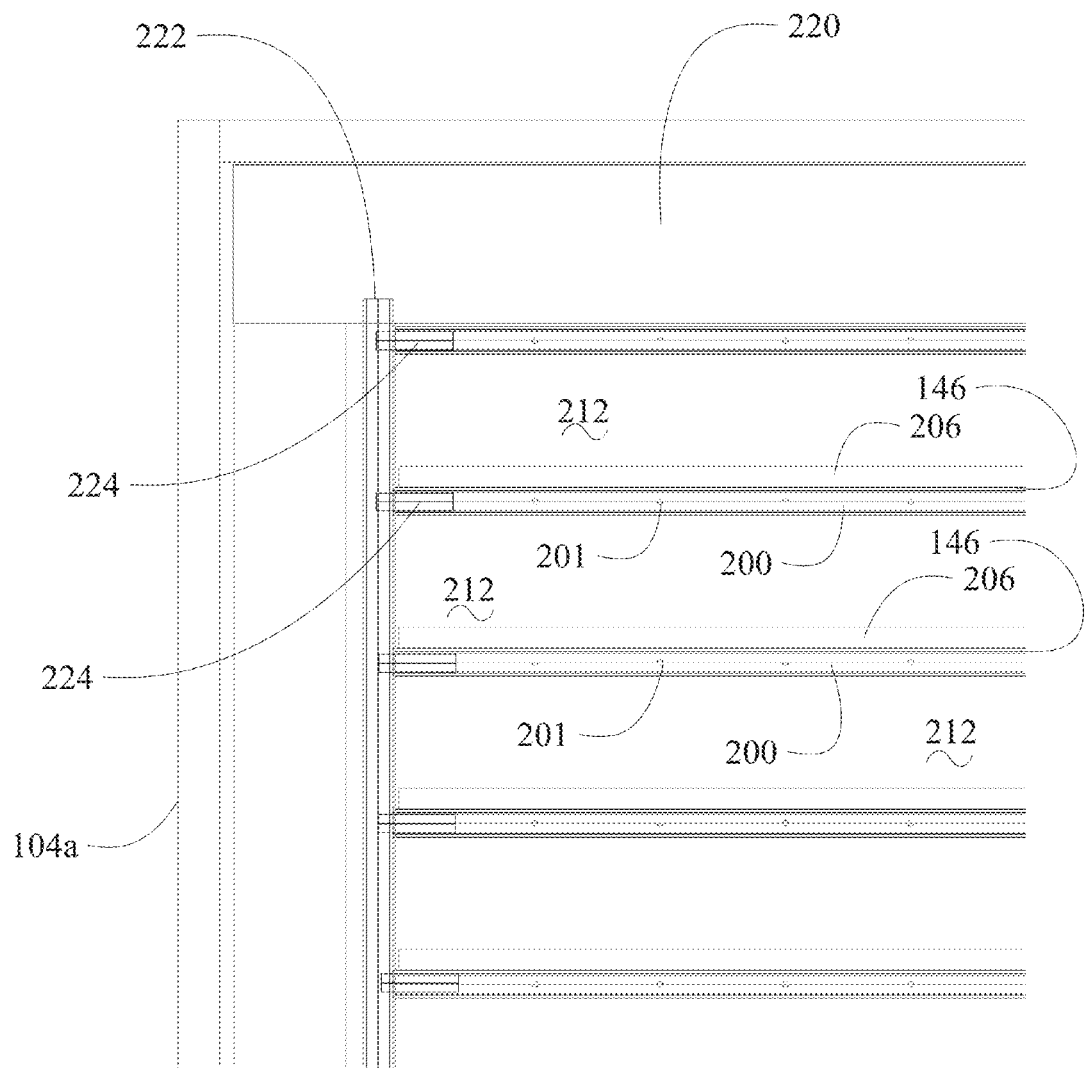
FIG. 7 is a detailed side section view of the second embodiment.

An alternative embodiment for placement of the dry ice cooling compartment is shown in FIGS. 6 and 7 wherein a cooling compartment 220 is placed within a top portion of the cavity 112 in the shell 140. A vertical conduit 222 extends downward from the cooling compartment 220 with nipples 224 or tees connecting into each piccolo tube 200 in the integrated support rails 146. Cooling gas then flows from cooling compartment 220 through the vertical conduit 222 into the piccolo tubes 200 and through orifices 201 into the cooling chambers 212 as represented by arrows 226. For the embodiments shown, the vertical conduit 222 may extend downward from the cooling compartment 220 on the side walls 141 and/or 142 at an edge adjacent the door 104a or, in alternative embodiments in a central location on the wall intersecting each support rail at a central tee.

Figure 8:
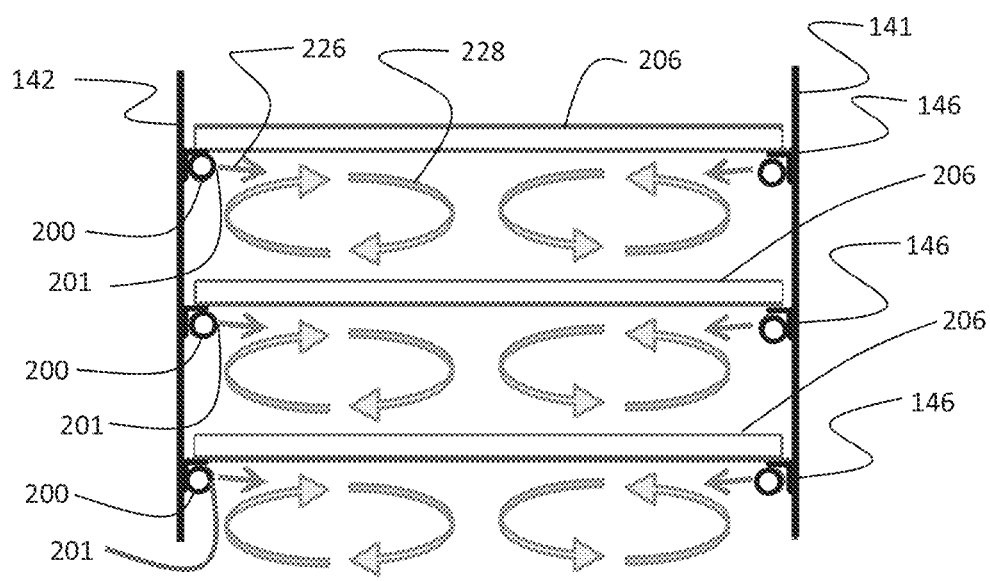
FIG. 8 is an end section view of cooling gas flow circulation from the integrated piccolo tubes; and, FIG. 9 is a flow chart of the method for cooling a galley cart provided by the disclosed embodiments.

With either embodiment described, flow of cooling gas through the piccolo tubes 200 is introduced through orifices 201 into the cooling chambers 212 between the food trays 206 as shown in FIG. 8. Cold gas circulation as represented by arrows 228 provides even distribution of cooling throughout the cooling chambers 212. Control of gas circulation by partially or fully blocking the orifices 201 may be employed to alter temperatures or chilling duration for the cooling chambers. For example, a nested concentric tube with holes match drilled to the orifices may be rotated coaxially or drawn longitudinally within the piccolo tube to constrict and then obscure the orifices based on the rotation angle or length of draw. Slotting of selected holes within the concentric tube may also allow selective blocking of orifices.

Figure 9:
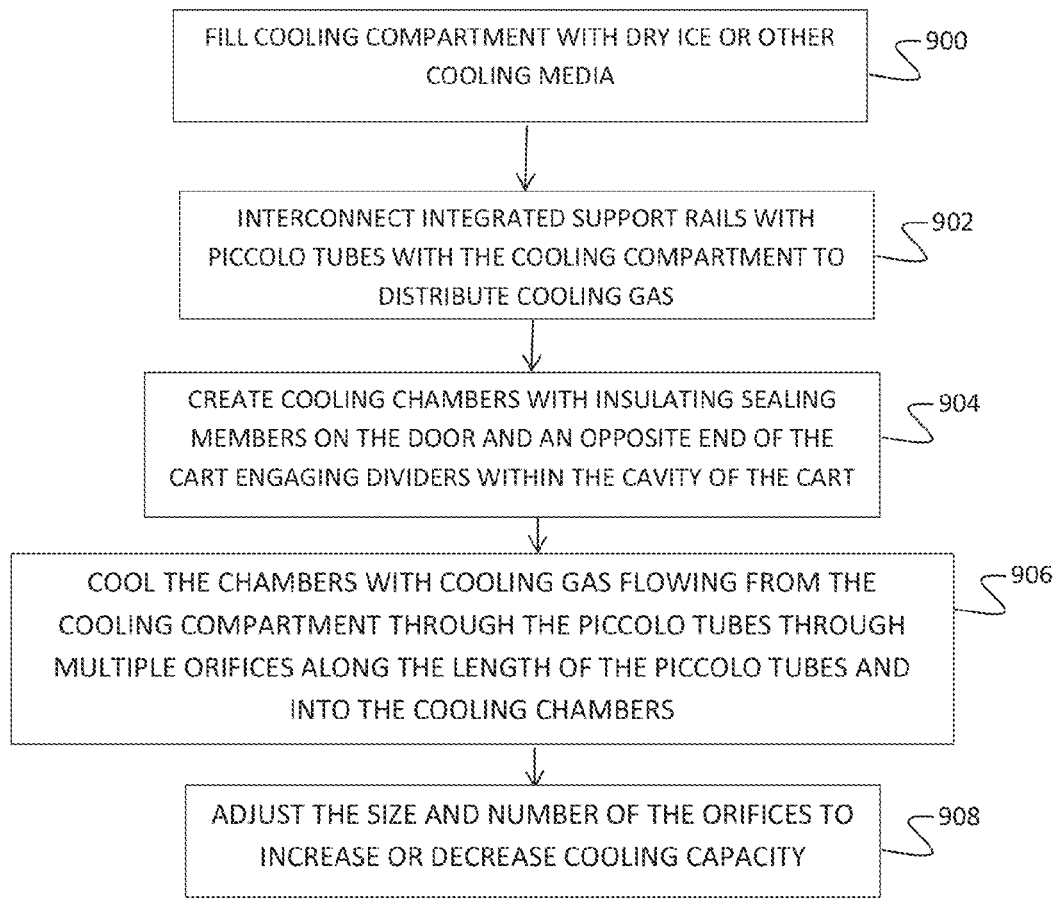

The embodiments herein provide a method for cooling a galley cart as shown in FIG. 9. A cooling compartment in the cart is filled with dry ice or other cooling media, step 900. Integrated support rails with piccolo tubes interconnected with the cooling compartment distribute cooling gas, step 902. Insulating sealing members on the door and an opposite end of the cart engage dividers to create cooling chambers within the cavity of the cart, step 904. Cooling gas flowing from the cooling compartment through the piccolo tubes through multiple orifices along the length of the piccolo tubes and into the cooling chambers cools the chambers, step 906. The size and number of the orifices may be adjusted to increase or decrease cooling capacity, step 908.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A container comprising:
    a housing defining a cavity and having an opening;
    a door hingedly attached to the housing to seal the opening and allow access to the cavity through the opening;
    a compartment configured to contain cooling media; and
    a plurality of support rails coupled to the housing within the cavity, each integrated support rail configured to at least partially support a tray within the cavity and each support rail integrated with a piccolo tube with a plurality of orifices defined therethrough to form an integrated support rail, the piccolo tube in each integrated support rail in flow communication with the compartment.

2. The container as defined in claim 1 wherein the compartment is defined at a top of the housing.

3. The container as defined in claim 2 further comprising a conduit in flow communication with the compartment and the piccolo tube in each integrated support rail.

4. The container as defined in claim 1 wherein the compartment is defined in the door.

5. The container as defined in claim 4 further comprising baskets in the door to hold the cooling media.

6. The container as defined in claim 4 further comprising an insulating seal on the door to seal against an end of the tray.

7. The container as defined in claim 1 further comprising wheels coupled to the housing.

8. The container as defined in claim 1 wherein the cooling media comprises dry ice.

9. A galley cart comprising:
    a housing having a shell with opposing walls forming a cavity and an opening;
    a door hingedly attached to the housing to seal the opening and allow access to the cavity through the opening;
    a compartment configured to contain cooling media;
    pairs of opposing supports mounted to the opposing walls, each support having an integrated piccolo tube with orifices, said piccolo tubes in flow communication with the compartment; and,
    dividers closely received in the cavity on the supports forming cooling chambers therebetween.

10. The galley cart as defined in claim 9 wherein the compartment is defined at a top of the housing.

11. The galley cart as defined in claim 10 further comprising a conduit in flow communication with the compartment and the tube.

12. The galley cart as defined in claim 9 wherein the compartment defined in the door.

13. The galley cart as defined in claim 12 further comprising baskets in door to hold the cooling media.

14. The galley cart as defined in claim 12 further comprising an insulating seal on the door to seal against an end of each divider.

15. The galley cart as defined in claim 9 wherein the cooling media comprises dry ice.

16. A method for cooling a galley cart having a cooling compartment holding cooling media, the method comprising:
    interconnecting support rails each including an integrated piccolo tube with a cooling compartment to distribute cooling gas;
    engaging dividers resting on the support rails with insulating sealing members on a door and an opposite end of the cart to create cooling chambers within a cavity of the cart; and,
    flowing cooling gas from the cooling compartment through the piccolo tubes through multiple orifices along the length of the piccolo tubes and into the cooling chambers to cool the chambers.

17. The method of claim 15 further comprising adjusting an area of the orifices to increase or decrease cooling capacity.

* * * * *